United States Patent
Mieger et al.

(10) Patent No.: US 7,086,804 B2
(45) Date of Patent: Aug. 8, 2006

(54) QUICK-CHANGE ATTACHMENT

(75) Inventors: Rolf Mieger, Kirchdorf-Unteropfingen (DE); Thomas Zitterbart, Dietenheim (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 0 days.

(21) Appl. No.: 10/803,791

(22) Filed: Mar. 18, 2004

(65) Prior Publication Data

US 2004/0184875 A1    Sep. 23, 2004

(30) Foreign Application Priority Data

Mar. 18, 2003   (DE)  ................. 103 11 927

(51) Int. Cl.
*F16B 7/08*    (2006.01)
(52) U.S. Cl. .................... 403/321; 403/322.1
(58) Field of Classification Search ............... 403/321, 403/322.1, 322.3
See application file for complete search history.

(56) References Cited

U.S. PATENT DOCUMENTS

| | | | | |
|---|---|---|---|---|
| 5,082,389 A | * | 1/1992 | Balemi | .............. 403/322.3 |
| 5,316,709 A | * | 5/1994 | Ko et al. | ................ 264/51 |
| 5,692,852 A | * | 12/1997 | Collins | ................ 403/234 |
| 5,951,192 A | * | 9/1999 | Collins | ................ 403/150 |
| 5,983,535 A | | 11/1999 | Kaczmarski et al. | |
| 6,132,130 A | * | 10/2000 | McCann | ............ 403/322.1 |
| 2002/0136597 A1 | * | 9/2002 | Nishikawa et al. | ...... 403/322.3 |

FOREIGN PATENT DOCUMENTS

| | | |
|---|---|---|
| EP | 0321902 | 6/1989 |
| EP | 0353454 | 2/1990 |
| EP | 0616084 | 9/1994 |
| EP | 1312720 | 5/2003 |
| FR | 2436743 | 4/1980 |

* cited by examiner

*Primary Examiner*—John R. Cottingham
(74) *Attorney, Agent, or Firm*—Dilworth & Barrese LLP

(57) ABSTRACT

The invention relates to a quick-change attachment to connect a tool, preferably, to the boom of a hydraulic excavator, comprising a boom-connecting quick-change attachment component to accommodate a tool, one end of which has a pin, and the other end of which is retained within a bearing of the quick-change attachment by positive-fit or friction engagement. According to the invention, a bushing in the form of a half-liner having a large support angle is inserted in the bearing.

21 Claims, 1 Drawing Sheet a)

b)

QUICK-CHANGE ATTACHMENT

BACKGROUND OF THE INVENTION

The invention relates to a quick-change attachment to connect a tool, preferably to the boom of a hydraulic excavator, comprising a boom-connecting quick-change component to accommodate a tool, one end of which has a pin, and the other end of which is retained in a bearing of the quick-change attachment by positive-fit or friction engagement.

Quick-change attachments of the above type are widely used on hydraulic excavators and other construction machinery since they provide for the simple and rapid exchange of various tools such as hydraulic grabs, digging-excavating buckets, grapplers, or the like.

This species of quick-change attachments, which are used principally on construction sites, are constantly exposed to dirt and other hard loads—with the result that the bearings, principally the semi-enclosed portions of the quick-change attachment, are subject to significant wear. In order to ensure the full functionality of quick-change attachment systems, the bearing must be regenerated after a certain level of bearing play has been reached. This regeneration is usually accomplished by welding-based hard-facing of the region of the bearing, and by re-boring the bearing in a horizontal boring machine. The result is an extended out-of-service period and considerable expense since this work is performed only by special shops.

SUMMARY OF THE INVENTION

The goal of the invention is therefore to modify a quick-change attachment of the species so as, first of all, to extend the tool life of the quick-change attachment, and secondly, to enable the quick-change attachment to be regenerated in a simple and cost-effective manner.

This goal is achieved according to the invention by the combination of features provided with a boom-connecting quick-change component to accommodate a tool, one end of which has a pin, and the other end of which is retained in a bearing of the quick-change attachment by positive-fit or friction engagement. To this end, a bushing implemented in the form of a half-liner with a large support angle ($\alpha$) is inserted in the bearing. The bushing is designed in such a way that it has a large circumferential support angle along with a correspondingly thick wall, thereby ensuring that the bushing is securely seated within its support area. The special advantage of the bushing is that it is a replaceable element which is easy to remove and replace within a short time period on the construction site.

Special embodiments of the invention are also presented herein.

The bushing may thus be composed of a wear-resistant material. In other words, the material quality of the bushing may be enhanced by selecting an especially wear-resistant material, or by treating the bushing using a suitable method for enhancing the quality of the material, for example, hardening or another wear-reducing method. The result is that the tool life of the bushing is increased by a factor of 2 to 3 times, while the overall service time of the quick-change attachment until the next regeneration is required is correspondingly extended.

In another advantageous embodiment of the invention, the bushing may be secured within a bushing support region of the bearing using an adhesive-bonding joint, shrink joint, welded joint, and/or screw connection.

In an especially advantageous embodiment of the invention, the bushing may be implemented with an external collar which specifically enhances the edge region in terms of strength and inherent stability. As a result, the edge pressure encountered may be accommodated without any significant deformation by the bushing. An additional advantageous aspect related to the bushing's inherent stability is the fact that the bushing is seated more firmly within corresponding bore hole provided within the bushing support region of the bearing.

The bushing in the form of a half-liner advantageously has an insertion slot which has essentially the same diameter as the bearing hole. As a result, a surface is created which still ensures good support within the high-strength bushing material present despite significant wear and displacement of the center-point of the tool-connecting pin.

Finally, the bushing may be composed of a curved, flat steel, whereby the faces of the bushing's free ends make contact within the bushing support region of the bearing. As a result, the bushing is optimally seated within the bushing support region of the bearing, and any radial displacement of the bearing within this bushing support region is effectively prevented.

BRIEF DESCRIPTION OF THE DRAWINGS

Additional features, details and advantages of the invention are presented based on an embodiment illustrated in the drawing.

DESCRIPTION OF THE PREFERRED EMBODIMENTS

Figure 1:
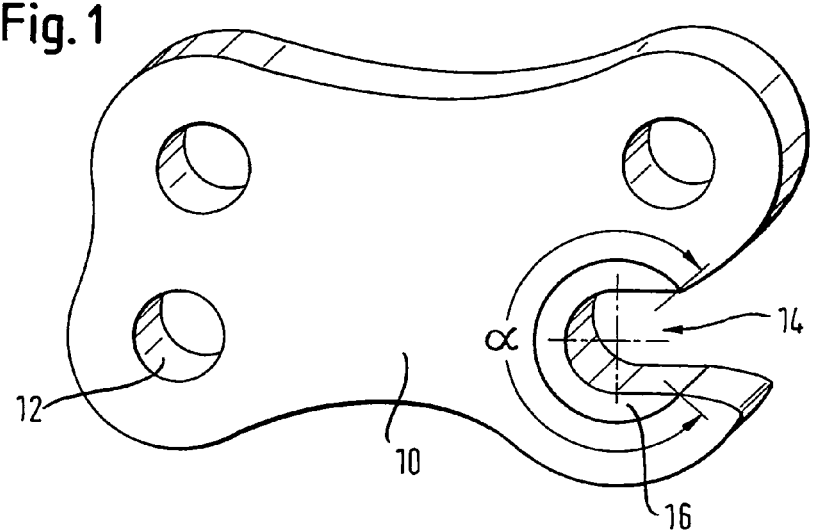
FIG. 1: is a perspective view of a boom-connecting quick-change attachment.

The quick-change attachment component 10 shown in FIG. 1 is pivotally attached to a stalk, not shown, of the boom of a hydraulic excavator, for example. Quick-change attachment component 10 pivots in the familiar manner via a swiveling link plate, also not shown, about a pivot axis perpendicular to the longitudinal axis. Quick-change attachment component 10 has a bore hole 12 to accommodate a tool-connecting pin, not shown here. In addition, quick-change attachment component 10 has a bearing 14 in which another pin of the tool, not shown, is retained by positive fit or frictional engagement According to the invention, a bushing 16 is inserted in bearing 14, bushing 16 being composed of a material which is more wear-resistant than the material of quick-change attachment component 10. Bushing 16 is fixed within a bushing support region of bearing 14, whereby this attachment may be implemented by an adhesive-bonding joint, shrink joint, welded joint, and/or screw connection, not shown in the figure. An essential aspect of the design of bushing 16 is the fact that it is formed by a half-liner having a large support angle $\alpha$. This design ensures that the bushing is securely seated within the bushing support region.

Figure 2:
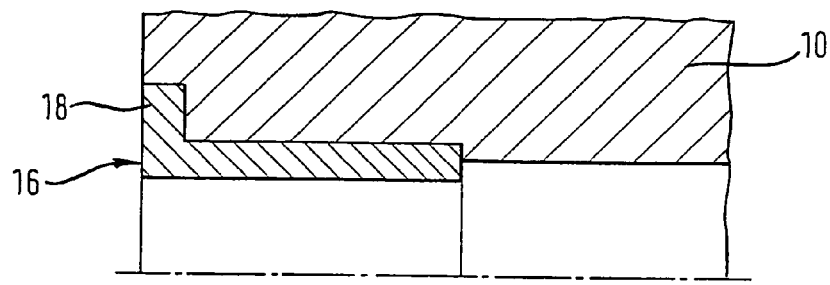
FIG. 2 shows an enlarged section through the quick-change attachment according to FIG. 1 and FIGS. 3a and 3b illustrate according to a segment of FIG. 1 illustrate different bushing designs.

FIG. 2 shows an especially advantageous embodiment of bushing 16. Here a collar 18 is integrally formed as part of the edge region of bushing 16. The bushing support region here is created within quick-change attachment component 10 by a suitable bore hole in which the diameter of the bushing, and also of the collar, are recessed in a form-conforming manner. The bushing along with the collar in the edge region results in an increased strength and inherent stability which specifically provide improved strength in response to edge pressures.

Figure 3:
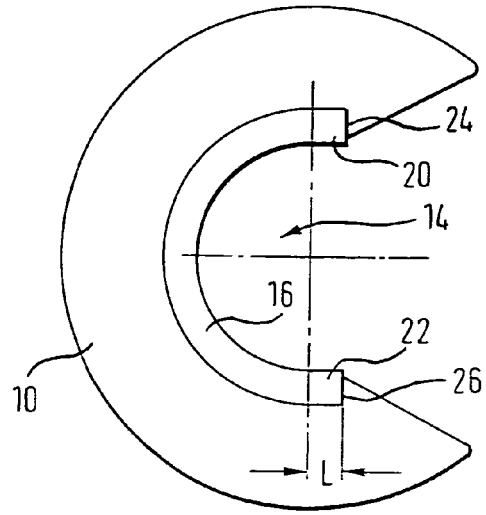
Figure 3:
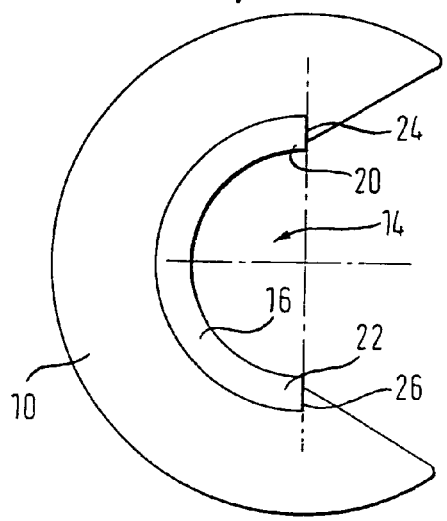

FIGS. 3a and 3b illustrate bushing designs in which bushings 16 are composed of half-liners fabricated from curved flat steel su 24 and 26 formed within the bushing support region of bearing 14.

The difference between the design variants of FIGS. 3a and 3b consists in the fact that FIG. 3b shows a symmetrical half-liner, whereas in FIG. 3a the ends of the half-liner are extended by an amount L.

By employing the bushing according to the invention, the intervals required to regenerate the quick-change attachment, as well as costs thus incurred, may both be significantly reduced.

The invention claimed is:

1. Quick-change attachment to connect a tool, comprising a boom-connecting quick-change component to accommodate a tool, one end of which has a pin, and the other end of which is retained in a bearing of the quick-change attachment by positive-fit or friction engagement, wherein a bushing in the form of a half-liner having a support angle (α) is inserted within the bearing, and the bushing is structured and arranged to be replaceable and easy to insert into and remove from the bearing.

2. Quick-change attachment according to claim 1, characterized in that the bushing is composed of a wear-resistant material.

3. Quick-change attachment according to claim 1, wherein the bushing is secured within the bushing support region of the bearing by at least one of an adhesive-bonding joint, shrink joint, welded joint, and screw connection.

4. Quick-change attachment according to claim 3, characterized in that the bushing has a collar.

5. Quick-change attachment according to claim 4, characterized in that the bushing in the form of a half-liner has an insertion slot which has essentially the same diameter as the a bearing hole.

6. Quick-change attachment according to claim 5, characterized in that the bushing is composed of a curved, flat steel, and that the faces of the bushing's free ends contact the bushing support region of the bearing.

7. Quick-change attachment according to claim 2, characterized in that the bushing is secured within the bushing support region of the bearing by an adhesive-bonding joint, shrink joint, welded joint, and/or screw connection.

8. Quick-change attachment according to claim 7, characterized in that the bushing has a collar.

9. Quick-change attachment according to claim 8, characterized in that the bushing in the form of a half-liner has an insertion slot which has essentially the same diameter as the a bearing hole.

10. Quick-change attachment according to claim 9 characterized in that the bushing is composed of a curved, flat steel, and that the faces of the bushing's free ends contact the bushing support region of the bearing.

11. The quick-change attachment according to claim 1, structured and arranged to connect the tool to a boom of a hydraulic excavator.

12. The quick change attachment according to claim 1, additionally comprising at least one bore hole for accommodating the tool-connecting pin.

13. The quick change attachment according to claim 12, comprising three said boreholes.

14. The quick-change attachment according to claim 8, wherein said collar is integrally-formed as part of an edge region of said bushing and the bearing comprises a complementarily-shaped borehole arranged to receive both said bushing and collar in recessed, form-conforming manner.

15. The quick change attachment according to claim 1, wherein the bushing has a collar integrally-formed as part of an edge region of said bushing and the bearing comprises a complementarily-shaped borehole arranged to receive both said bushing and collar in recessed, form-conforming manner.

16. The quick change attachment according to claim 1, wherein the bearing comprises a bushing-support region having contact shoulders formed therewithin and structured and arranged to contact free-ends of the bushing which is formed as a curved half-liner.

17. The quick change attachment according to claim 16, wherein the bushing is formed as a symmetrical half-liner.

18. The quick change attachment according to claim 17, wherein the bushing is formed as an asymmetrical half-liner, with the free-ends extending beyond a normally-extending symmetrical plane.

19. Quick-change attachment according to claim 1, wherein said bushing is situated within a bearing hole remaining open opposite said bushing, even after insertion of the tool in said bearing hole.

20. Quick change attachment according to claim 1, wherein both said bearing and bushing are crescent-shaped and aligned with one another to define a substantially C-shaped opening for receiving the tool.

21. Quick-change attachment to a connect a tool, comprising
a boom-connecting quick-change component to accommodate a tool, one end of which has a pin, and the other end of which is retained in a bearing of the quick-change attachment by positive-fit or friction engagement,
wherein a bushing in the form of a half-liner having a support angle (α) is inserted within the bearing, and
both said bearing and bushing are crescent-shaped and aligned with one another to define a substantially C-shaped opening for receiving the tool.

* * * * *